United States Patent [19]
Nash et al.

[11] Patent Number: 6,094,766
[45] Date of Patent: Aug. 1, 2000

[54] PERSONAL HYGIENE PRODUCT

[76] Inventors: Alan E. Nash; Suzanne O. Nash, both of 50 Green St., Canton, Mass. 02021

[21] Appl. No.: 09/226,439

[22] Filed: Jan. 6, 1999

[51] Int. Cl.[7] .............................. A47K 7/02; A47L 13/12
[52] U.S. Cl. ....................... 15/104.93; 15/118; 15/244.1; 15/244.3; 15/244.4
[58] Field of Search ............................... 15/118, 104.93, 15/104.94, 244.1, 244.3, 244.4

[56] References Cited

U.S. PATENT DOCUMENTS

| | | | |
|---|---|---|---|
| 2,906,642 | 9/1959 | Dennis | 15/244.1 |
| 3,570,036 | 3/1971 | Gilchrist | 15/104.94 |
| 5,640,737 | 6/1997 | Boggs | 15/244.4 |

*Primary Examiner*—Randall E. Chin
*Attorney, Agent, or Firm*—Steven N. Fox; Hancock & Estabrook, LLP

[57] ABSTRACT

The present invention is a personal hygiene product for use upon the skin of a person and a process for forming the same. In one embodiment, the personal hygiene product comprises a buff portion having an abrasive and textured lower surface. The personal hygiene product further comprises a first foam layer impregnated within the buff portion and a second foam layer chemically bonded to the combination of the first foam layer and the buff portion. The first and second foam layers may comprise a variety of agents, including a foam agent and a cleansing agent.

1 Claim, 2 Drawing Sheets

PERSONAL HYGIENE PRODUCT

FIELD OF THE INVENTION

The present invention relates generally to personal hygiene products.

BACKGROUND OF THE INVENTION

Many people use a variety of personal hygiene products to clean and/or moisturize various parts of their body. Such personal hygiene product include sponges made from a highly porous water absorbent material, plastic brushes, and bathing towels. The primary object of the present invention is to provide a single personal hygiene product that can be used by a person to perform a variety of personal hygiene tasks.

SUMMARY OF THE INVENTION

The present invention is a personal hygiene product for use upon the skin of a person and a process for forming the same. In one embodiment, the personal hygiene product comprises a buff portion having an abrasive and textured lower surface. The personal hygiene product further comprises a first foam layer impregnated within the buff portion and a second foam layer chemically bonded to the combination of the first foam layer and the buff portion. The first and second foam layers may comprise a variety of agents, including a foam agent and a cleansing agent.

BRIEF DESCRIPTION OF THE DRAWINGS

The following description of the invention will be better understood with reference to the accompanying drawings in which.

DETAILED DESCRIPTION OF THE PREFERRED EMBODIMENTS

Figure 1:
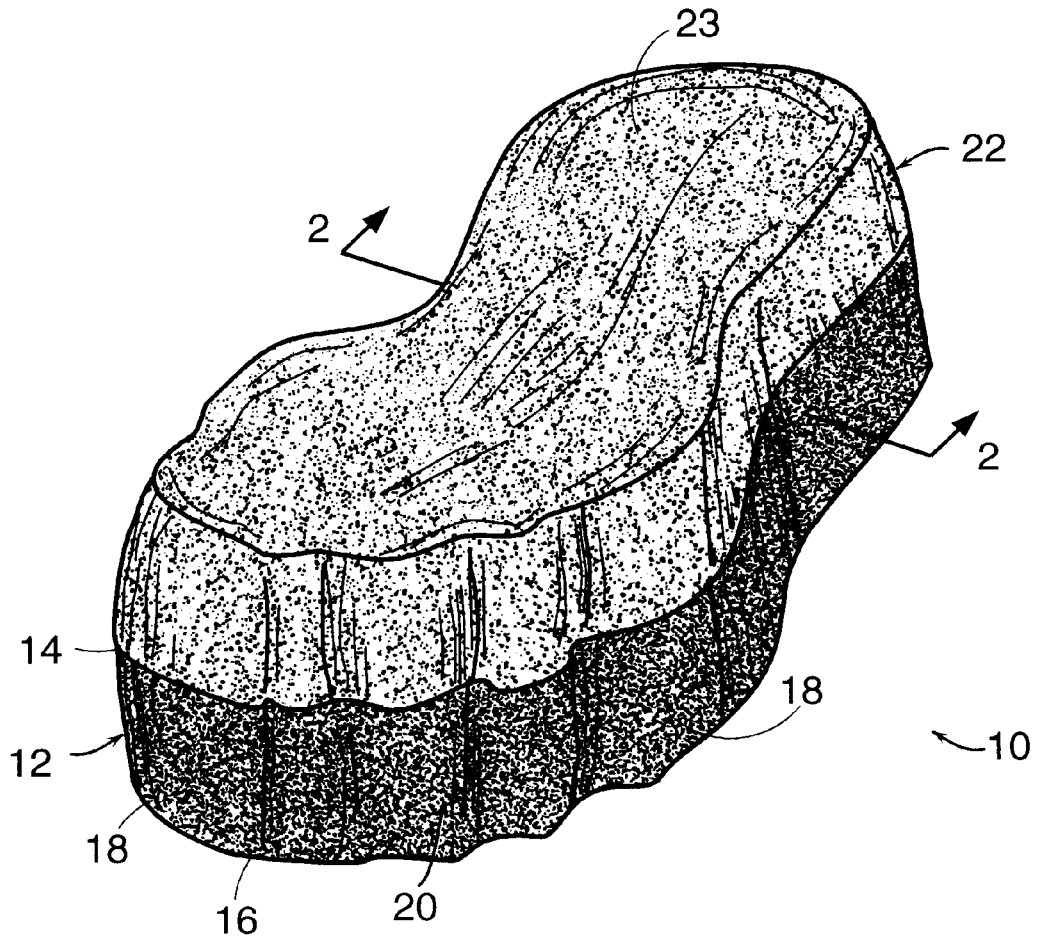
FIG. 1 is a perspective view of a first embodiment of the personal hygiene product the present invention.
Figure 2:
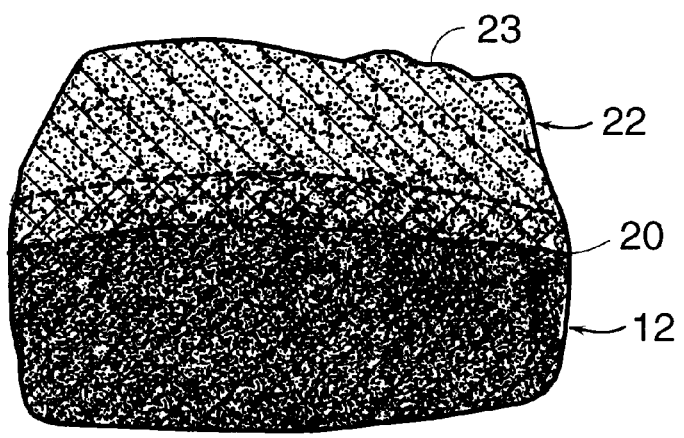
FIG. 2 is a cross-section view taken along line 1—1 of FIG. 1.

Referring to FIGS. 1 and 2, wherein the present invention is a personal hygiene product 10 for use upon the skin of a person. In one embodiment, the personal hygiene product 10 comprises a brush or buff portion 12 having an upper surface 14, a lower surface 16 and side surfaces 18. The buff portion 12 acts as an exfoliator to remove unwanted skin and other formations upon the skin such as callas and corns. The buff portion 12 material is made from a non-woven material such that the lower surface 16 has an abrasive and textured contour.

The personal hygiene product 10 further comprises a first foam layer 20 impregnated throughout the buff portion 12 and a second foam layer 22 disposed and formed on top of the combination of the buff portion 12 and the impregnated first foam layer 20. The first foam layer 20 may comprise a pre-mixed combination of a liquid foam such as hydrophilic foam and a cleaning agent such as shampoo. The first foam layer 20 may also comprise a variety of other agents depending upon the desired application. By way of example only, the first foam layer 20 may also comprise a deodorant agent, a moisturizer agent, an anti-fungal agent, an anti-microbial agent, an anti-bacterial agent, and/or a fragrance agent.

The second foam layer 22 is preferably made from the same material of formulation as the first foam layer 20. Unlike the buff portion 12, the second foam layer 22 has a soft and smooth textured surface 23.

Impregnation of the buff portion 12 with the first foam layer 20 allows the agents in the first foam layer 20 to be dispensed when the lower surface 16 is brought into contact with the skin of a person. Impregnation of the buff portion 12 with the first foam layer 20 forms a unitary and one-piece structure which is chemically compatible with the second foam layer 22. This allows the second foam layer 22 to be subsequently formed on top of the combination of the buff portion 12 and the first foam layer 20 thereon as an additional layer which will not degrade or otherwise separate thereby increasing the overall life of the product. Moreover, the unitary and one-piece structure of the product 22 provides durability and strength to the buff portion 12 thereby maintaining the overall shape and contour of the buff portion 12. Impregnation of the buff portion 12 with the first foam layer 20 and the resultant dispersement of agents at the textured lower surface 16 increases the overall life of the textured lower surface 16. The resultant disbursement of agents acts to lubricant the textured lower surface 16 as it is used upon the skin of a person. Without impregnation of the buff portion 12 with the first foam layer 20, the textured lower surface 16 would degrade when the lower surface 16 is used over ruff areas of the person's skin.

Figure 3:
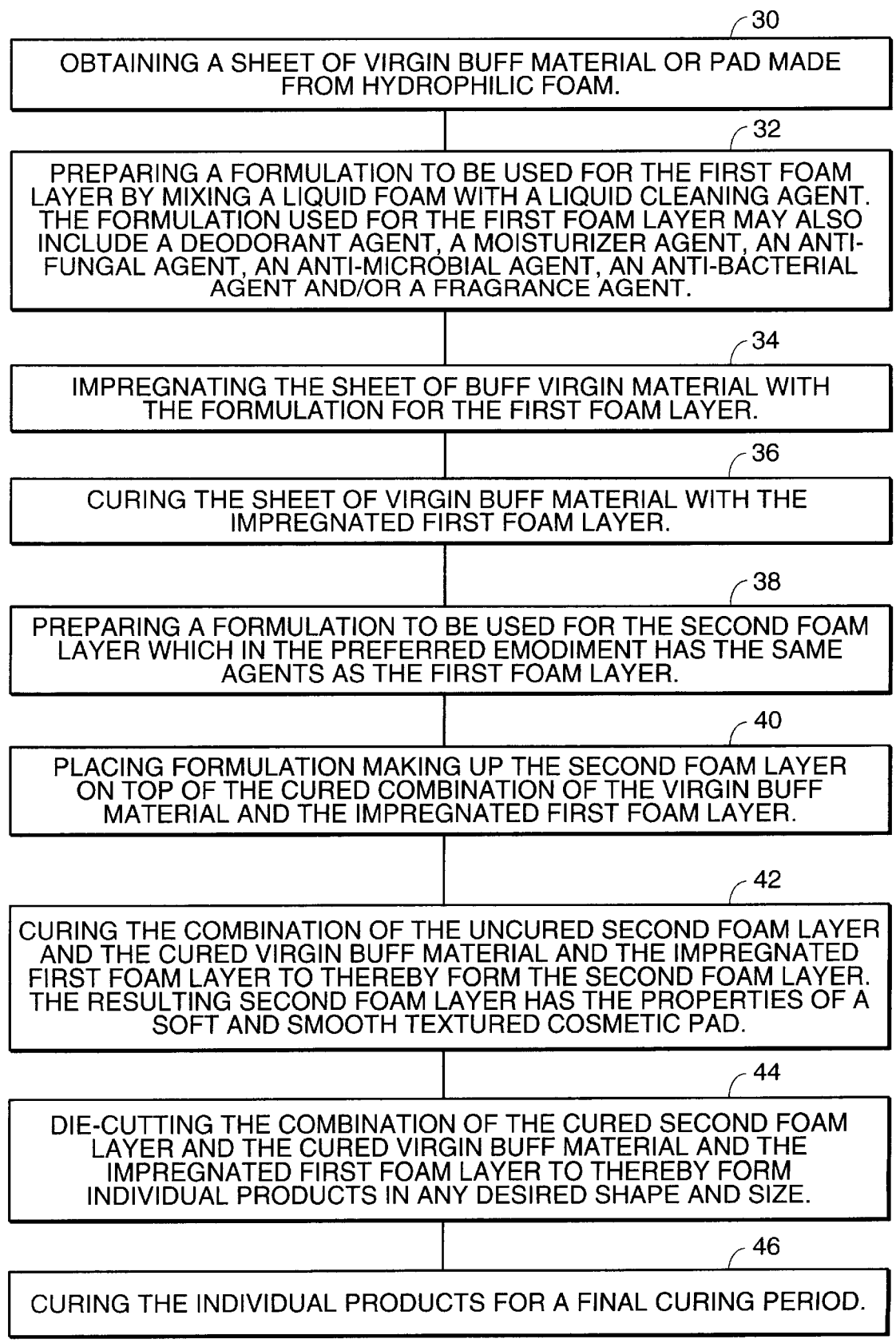
FIG. 3 is a flow chart showing a first embodiment of a process for forming the personal hygiene product of the present invention.

Referring to FIG. 3, wherein a process for forming the personal hygiene product 10 is described. As shown by block 30, the process comprises the step of obtaining a sheet of virgin buff material or pad made from a non-woven material. As shown by block 32, the process comprises the further step of preparing a formulation to be used for the first foam layer by mixing a liquid hydrophilic foam with a liquid cleaning agent. The formulation used for the first foam layer may also include a deodorant agent, a moisturizer agent, an anti-fungal agent, an anti-microbial agent, an anti-bacterial agent and/or a fragrance agent. As shown by block 34, the process comprises the further step of impregnating the sheet of buff virgin non-woven material with the formulation for the first foam layer. As shown by block 36, the process comprises the further step curing the sheet of virgin buff material with the impregnated first foam layer. As shown by block 38, the process comprises the further step of preparing a formulation to be used for the second foam layer which in the preferred embodiment has the same agents as the first foam layer. As shown by block 40, the process comprises the further step of placing formulation making up the second foam layer on top of the cured combination of the virgin buff material and the impregnated first foam layer. As shown by block 42, the process comprises the further step of curing the combination of the uncured second foam layer and the cured virgin buff material and the impregnated first foam layer to thereby form the second foam layer. The resulting second foam layer has the properties of a soft and smooth textured cosmetic pad. As shown by block 44, the process comprises the further step of die-cutting the combination of the cured second foam layer and the cured virgin buff material and the impregnated first foam layer to thereby form individual products in any desired shape and size. As shown by block 46, the process comprises the further step curing the individual products for a final curing period.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed:

1. A personal hygiene product for use by a person to clean his or her body, the personal hygiene product comprising:
   (a) a buff portion having an upper surface and a lower surface, said lower surface having an abrasive and textured contour;
   (b) a first foam layer impregnated within said buff portion and extending from said upper surface to said lower surface, said first foam foam layer comprises a foam agent and a cleansing agent; and
   (c) a second foam layer chemically bonded to said first foam layer such that said second foam layer is disposed upon and covers said upper surface of said buff portion, said second foam foam layer comprises a foam agent and a cleansing agent.

* * * * *